United States Patent [19]

Bremer

[11] Patent Number: 5,420,410
[45] Date of Patent: May 30, 1995

[54] BAR CODE SIGNAL DIGITIZER ADAPTED FOR SIGNALS FROM INVERSE BAR CODES

[75] Inventor: Edward C. Bremer, Rochester, N.Y.
[73] Assignee: PSC, Inc., Webster, N.Y.
[21] Appl. No.: 215,076
[22] Filed: Mar. 18, 1994
[51] Int. Cl.$^6$ ............................................. G06K 7/10
[52] U.S. Cl. ................................. 235/462; 235/472; 235/455
[58] Field of Search .................. 235/462, 472, 455

[56] References Cited

U.S. PATENT DOCUMENTS

| | | | |
|---|---|---|---|
| 4,656,345 | 4/1987 | Kurimoto | 235/455 X |
| 5,200,597 | 4/1993 | Eastman et al. | 235/455 |
| 5,210,397 | 5/1993 | Eastman | 235/436 |
| 5,227,614 | 7/1993 | Danielson et al. | 235/380 |

Primary Examiner—Donald Hajec
Assistant Examiner—Michael G. Lee
Attorney, Agent, or Firm—Joseph F. Murphy

[57] ABSTRACT

In order to prevent a digitizer which receives signals from a bar code reader which scans an inverse code (white bars on black background as opposed to a direct or normal code with black bars on white background) from improperly digitizing a white space as a black bar and also, if desired, to enable the digitizer to operate properly in digitizing signals from direct or inverse codes without switching the digitizer from direct to inverse digitizing mode by operator control, the digitizer is operated, automatically under computer control on different ones of a series of successive scans of the code, which are carried out until the code is successfully read, to provide an output, which is of different states when reading white sections and black sections of the code, and to be restored, respectively, to a state corresponding to the reading of a black section of the code and to a state corresponding to the reading of a white section of the code, when a direct code is to be digitized and when an inverse code is to be digitized. In effect, the output is prevented from being restored to a black representing state when a direct code is to be digitized and to a white representing state when an inverse code is to be digitized. In addition, the digitizer has circuitry for inverting the state of the digitized bar code output of the digitizer when inverse codes are digitized.

9 Claims, 3 Drawing Sheets

BAR CODE SIGNAL DIGITIZER ADAPTED FOR SIGNALS FROM INVERSE BAR CODES

The present invention relates to systems for digitizing bar code representing signals and particularly to a digitizer system which can digitize inverse bar codes in a manner to provide bar code representing outputs suitable for decoding which are the same whether the bar code signal is produced from light returned from a direct or normal bar code or an inverse bar code. By direct or normal bar code is meant a code where the bars are of less reflectivity than the background, which background includes the spaces between the bars (that is black bars on a white background). An inverse bar code is a code where the bars are more reflective than the background on which they are disposed including the spaces therebetween.

This application is related to the following patents and applications which are owned by the same assignee as this application: U.S. Pat. No. 5,200,597, issued Apr. 6, 1993 to Eastman et al. and entitled "Digitally Controlled System For Scanning and Reading Bar Codes"; U.S. Pat. No. 5,210,397, issued to Eastman on May 11, 1993 and entitled "Differentiating And Integrating Circuit For Translating Bar Code Signals Into Corresponding Pulses;" and U.S. application Ser. No. 08/059,797, filed May 10, 1993 by Edward Bremer, the same inventor who filed the present application, and entitled "Bar Code Inhibitor Circuit."

The present invention is especially suitable for use in a digitizer of the type described in the Eastman et al. and Eastman patents and which uses an inhibitor circuit of the type described in the Bremer application. Reference to the Eastman and Eastman et al. patents and the Bremer application may be had for information concerning the systems and circuits described herein which are similar in their aspects and/or features to the systems and circuits of these patents and patent application. The present invention may be applicable to other digitizers in which the problem of false digitization of inverse bar codes requires solution.

It has been recognized that handling of inverse bar codes and particularly the digitization thereof can lead to output signals which do not correctly represent the widths of the bars and spaces of the code. U.S. Pat. No. 5,227,614, issued to Danielson, et al. on Jul. 13, 1993 recognizes the problem and resorts to a complex waveform analysis techniques to obviate misreads and improper digitization of the analog signals obtained from the photo detector of the bar code reader and which represent inverse bar codes. In other words, the problem of digitizing analog signals from direct codes and codes which are inverted, in accordance with their bar code symbologies, is more complex than merely inverting the state of the output so that the state which represents a bar of a normal bar code represents a space of an inverse bar code, while a bar of an inverse bar code represents a space of a normal bar code.

The state of the output may also be thought of as its polarity being either logic level high or logic level low. Inverting the logic levels of the output of the digitizer when an inverse bar code is being digitized does not solve the problem of handling inverse bar codes in a digitizer which is designed for direct or normal codes. An erroneous digitization often occurs when the background changes from black to white initially as the code is scanned. This is called the first transition of the code. Such a first transition will be digitized as a black bar, particularly in a dual diode digitizer such as described in the above-identified Eastman and Eastman et al. patents. Moreover, this erroneous black bar signal is distorted and invariably will either not be decoded or result in erroneous data representing the code upon decoding.

It has been discovered in accordance with the invention that improper decoding, and particularly the improper digitization of the first black to white transition as a black bar, can be eliminated and the digitizer enabled to properly digitize inverse codes when the digitizer is operated to cause its output to return or restore to the state representing a black background when an inverse code is to be decoded and to a state representing a white output where a direct code is to be decoded. Also at the same time the digitized output is inverted when an inverse code is being digitized. A circuit such as the bar code inhibitor circuit of the above-referenced Bremer application which prevents generation of outputs falsely representing bars and/or spaces of a direct or normal code, is inhibited when an inverse code is being digitized.

Accordingly, it is the principal object of the present invention to provide an improved system for digitizing bar codes, which is adapted to properly digitize inverse bar codes.

It is a further object of the invention to provide an improved digitizer system for bar codes which are either direct or inverse bar codes and which is operative on different scans of a series of scans of the code until the code is properly read to enable the digitizer to correctly digitize direct and inverse bar codes.

It is a still further object of the present invention to provide an improved bar code digitizing system which need not be manually reset by an operator so as to enable inverse bar codes to be digitized.

It is a still further object of the invention to provide a bar code digitizing system, of the type utilizing a dual diode integrator or delay circuit operative upon a differentiated analog bar code signal, to provide, with the differentiated bar code signal inputs to a comparator which provides the digitized bar code output and which is enhanced with hardware and control software so as to enable digitization of inverse bar codes as well as direct bar codes.

Briefly described, a system for enabling a bar code reader for reading a direct or normal bar code having bars of lower reflectivity than the background on which the bars are disposed, to read inverse bar codes, in accordance with the invention, has means for digitizing signals representing light returned when the code is scanned into a digitized bar code output having two states, one corresponding to the bars and the other corresponding to the background. The system also includes means for restoring the output to one of these states. Means are provided in the system for changing the state to which the restoring means restores the output when the inverse bar code is being digitized, thereby inhibiting a premature change of state at the onset of scanning of the code. The system also includes means for inverting the states of the bar code representing digitized output when the inverse bar code is being digitized to as to provide a digitized output having like states whether representing direct or inverse bar codes.

The foregoing and other objects, features and advantages of the invention as well as a presently preferred embodiment thereof will become more apparent from a reading of the following description in connection with the accompanying drawings in which.

Figure 1:
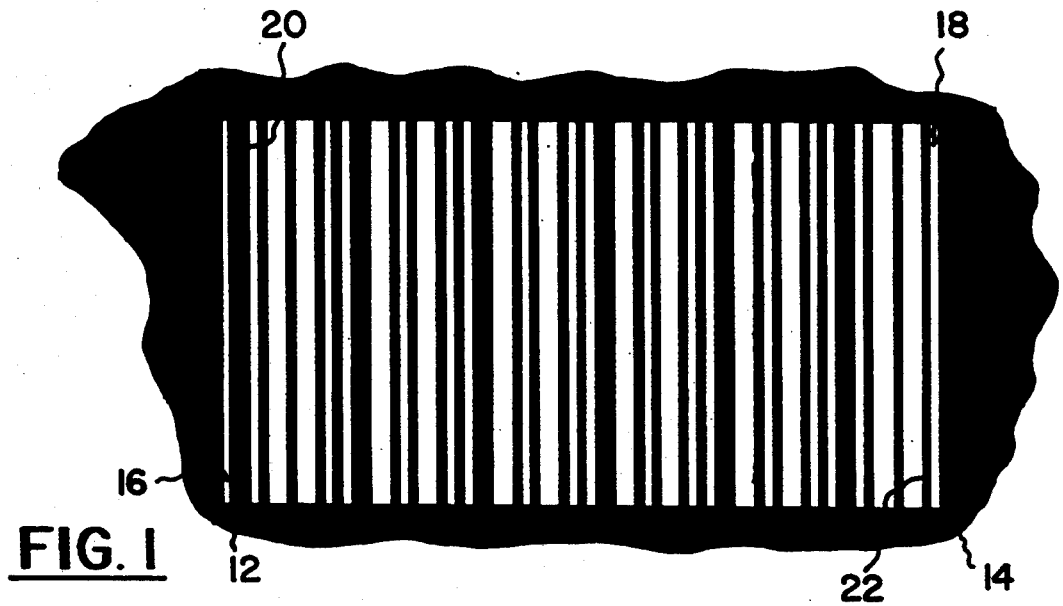
FIG. 1 is diagram of an inverse bar code.

Referring to FIG. 1 there is shown an inverse bar code. Whether the code is scanned from left to right by a bar code reader, such as shown in the above referenced Eastman et al. patent, or from right to left with such a bar code reader, the first encounter upon leaving the left or right background areas 12 or 14 is white bar, either bar 16 or 18. The black to white transition encounter at the onset of the inverse code will be digitized as a black bar with a digitizer system of the Eastman and Eastman et al patents when designed to restore the digitizer to provide a white representing output state. The digitizer system provided by the invention precludes such undesired operation.

Figure 2:
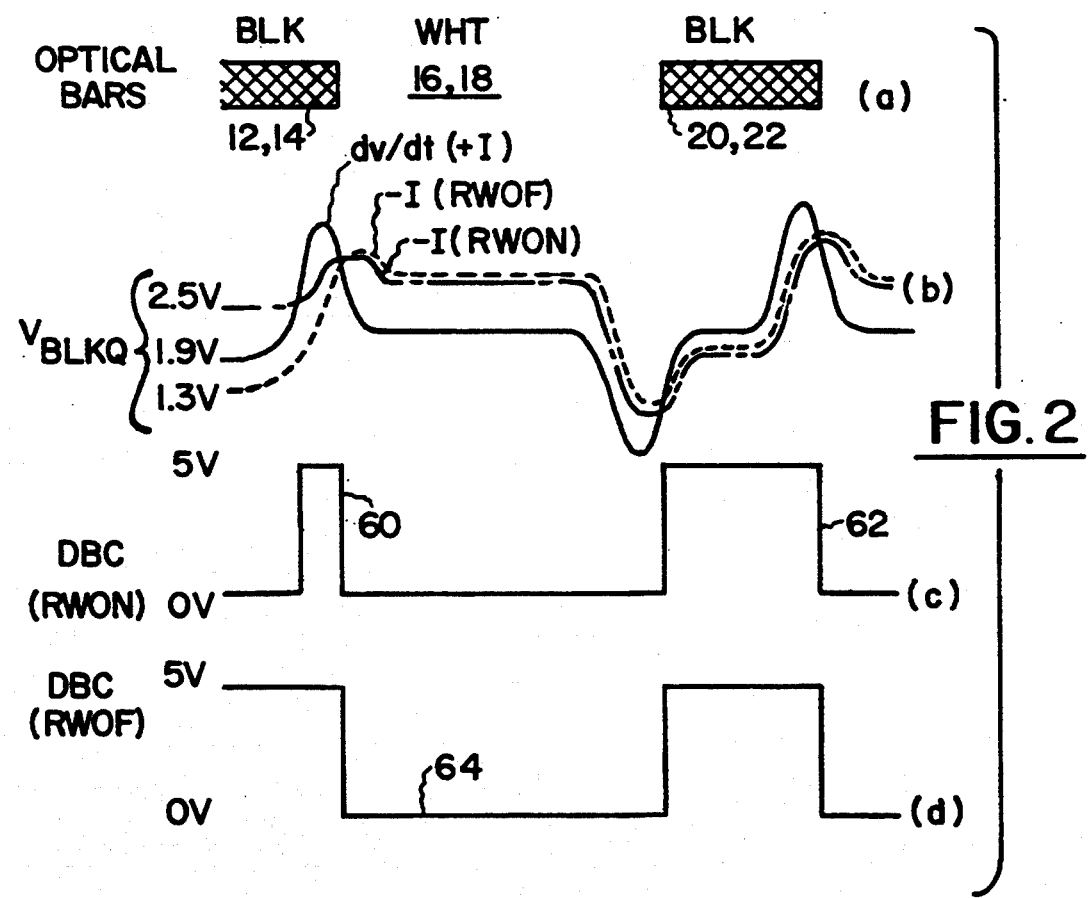
FIG. 2 is a diagram illustrating the operation of a digitizer system shown in FIG. 3 when digitizing the first transition of an inverse bar code.
Figure 3:
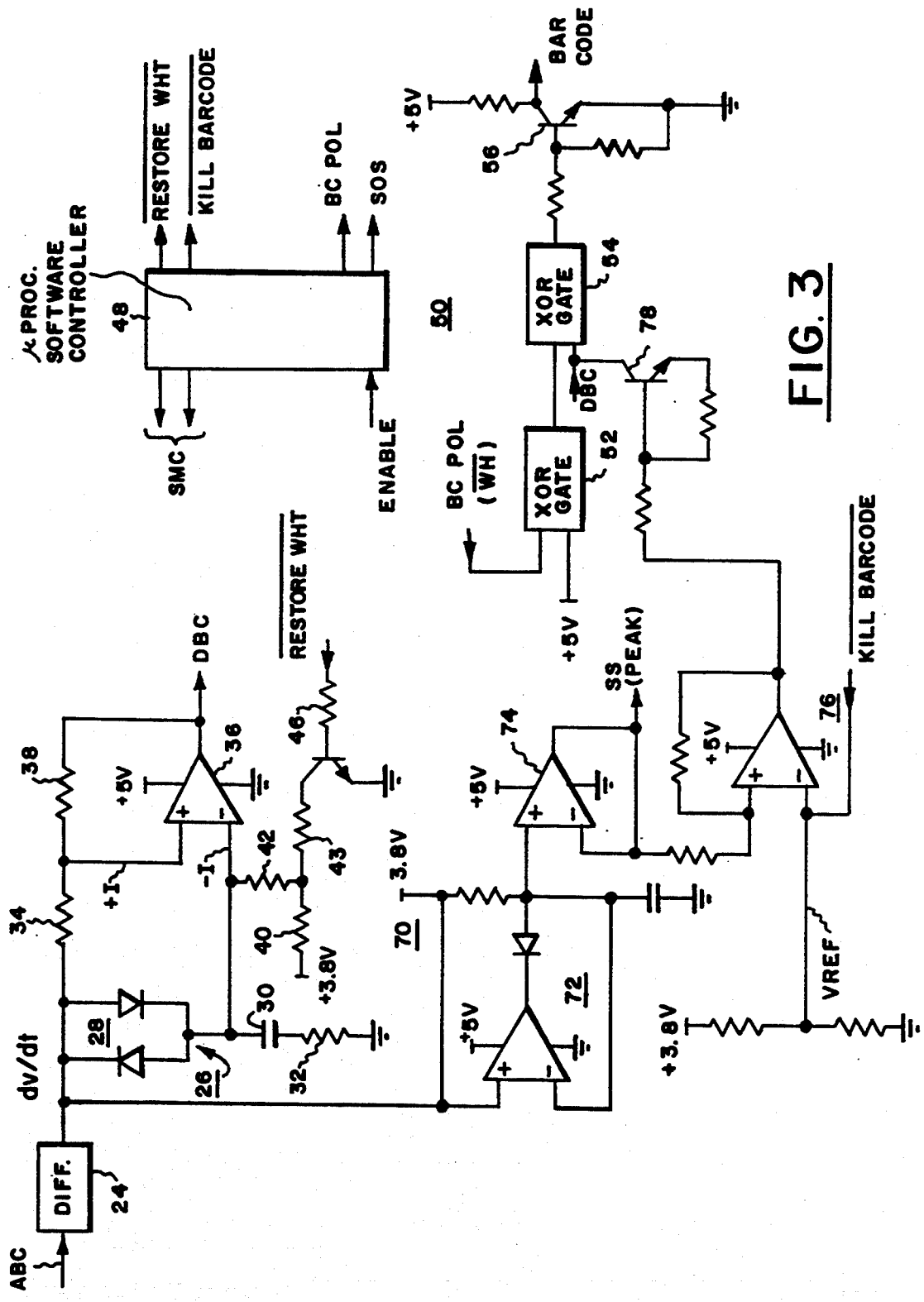
FIG. 3 is a schematic diagram of a digitizer system embodying the invention.

Referring to FIGS. 2 and 3, Part (a) of FIG. 2 shows the background (either 12 or 14) the white bar (either 16 or 18) and the next black space (either 20 or 22). As the beam scans or sweeps across the code an analog bar code signal (ABC) is differentiated, in a differentiating circuit 24 of the digitizer to produce the differential output signal (dV/dT). This differentiated analog bar code representing signal is delayed in the double diode integrator or delay circuit 26 having the oppositely polarized diodes 28 connected to ground through a capacitor 30 and resistor 32.

The dV/dT signal is applied via a resistor 34 to the non-inverting (+I) input of a operational amplifier 36 which operates as a comparator, while the integrated and delayed output is applied to the inverting input (−I) of comparator 36. The comparator, operational amplifier 36 operates between operating voltage limits or "rails" of +5 volts and ground. Stabilization and hysteresis is provided by a feedback resistor 38 between the output of the comparator 36 and its non-inverting input.

The dV/dT, digitized analog bar code signal is shown in a full line curve, in Part (b) of FIG. 2. The integrated and delayed signal which is applied to the non-inverting terminal is shown in two ways by a curve made up of long and short dashes and a curve made up of short dashes. This integrating and delayed signal is modified by a reference voltage which is applied from a source, indicated in this example as +3.8 volts, through a pair of resistors 40 and 42. One of these resistors 40 is shunted by a resistor 43 and the collector to emitter path of a NPN transistor 44. The base of this transistor 44 receives a control voltage through a resistor 46 from a microprocessor which operates as a software operated controller 48. This controller is of the type described in the above-referenced Eastman patent and provides a plurality of control signals. The control signal going to the base of the transistor 44 is identified as not restore white or $\overline{\text{RESTORE WHIT}}$.

There are other input signals to and output signals from the controller 48. Some of these outputs SMC go to the scanning motor control of the bar code reader and cause the beam to be scanned across the code. An enable input, either from the trigger or from a host computer, enables the reader to scan the code. Each scan, or frame, is a scan where the entire code is scanned by the beam and return light is detected and translated into ABC. At the start of each scan, which can be in opposite directions, the controller 48 generates a SOS (start of scan) signal. There are two other outputs. One of these is BC POL (bar code polarity) which changes the states of the digitizer output, called BAR CODE. BC POL controls inverter circuit 50 consisting of two exclusive or (XOR) gates 52 and 54 connected in tandem with each other and with a transistor, inverter amplifier 6 of unity gain. The output of the amplifier 56 is the signal called BAR CODE, which is supplied to the decoder of the reader.

The digitized bar code (DBC) from the output of the comparator 36 is applied to the exclusive or gate 54. Depending upon BC POL, being of a low or high level, respectively; the state of bar code is either inverted or not inverted. With reference to a normal code where DBC high represents a white space and, DBC low represents a black bar, BC POL is set to a high level (five volts) rather than ground, which is the low level. If BC POL is set to a high level, this does not change the states in the inverter 50 and a space is still represented as a high level and a bar as a low level, which is convention for direct or normal codes. Then there is a double inversion of DBC in the inverter 50 first in gate 54 and then in the inverter stage 56, so that DBC, which is high in the presence of a black bar in a direct code, passes through the inverter with inversion, because of the double diversion, one in X or 54 and the other in inverter 56. In the case of a inverse code BC POL is low, and there is only one inversion in the inverter stage 56 and a white bar is represented by a low level state, while a black space is represented by a high level. Therefore, bars and spaces are digitized to provide an output with the same states irrespective of whether the code is a direct code or a inverse code.

The low level, not restore white input to the gate of the transistor 44 prevents conduction through the collector to emitter path of this transistor and applies, due to the voltage drop in the resistors 40 and 42, a bias voltage from the 3.8 volt reference of approximately 2.5 volts in the absence of a transition represented in the integrated dV/dT analog bar code signal. See the curve of long and short dashes in FIG. 2(b). Since the non-inverting input is then lower in level than the inverting input, because the differentiating circuit then nominally provides an output level of 1.9 volts, as shown in FIG. 2(b) in the full line curve, the DBC output is restored to a high level state which is the restore to white condition. This restore to white condition effectively reduces the delay of the integrated signal which is applied to the inverting input due to the voltage across the capacitor 30 and resistor 32. Then a false DBC occurs when the return to white is on as shown by the curve made up of long and short dashes and also marked −I(RWON). A false black bar 60 is generated in the DBC output, since the non-inverting input becomes higher and then lower than the inverting input of the operational amplifier, comparator 36. Thus, with the restore to white signal, on as a low level control voltage from the controller 48, the false black bar 60 is generated, as indicated in part (c) of FIG. 2. Another transition occurs after the white bar (16 or 18) and before the next black space (20, 22). The delayed voltage from the dual diode integrator and delay circuit 26 then becomes higher than the dV/dT which is applied to the non-inverting input of the amplifier, comparator 36 and a proper and correct black output is generated corresponding to the black space 20 or 22. This output is indicated at 62 in FIG. 2, Part (c).

In order to remove the false black bar, the not restore white control voltage to the transistor 44 from the controller 48 becomes positive. This causes the transistor collector to be connected to ground, and places the digitizer system output in the restore to black state. Then the reference bias voltage is reduced to approximately 1.3 volts or a sufficient voltage so that the integrated output from the integrator and delay circuit 26 to the inverting input does not become greater than the dV/dT voltage from the differentiator which is applied to the non-inverting input until a time corresponding to the first transition from the black background 12 or 14 to the white bar 16 and 18. See the curve of shot dashes marked −I(RWOF) in FIG. 2(b). The output DBC then switches to a low state, as shown at 64 in part (d) of FIG. 2, for the duration of scanning of the white bar 16 or 18. On the next transition the black space 20 or 22 is properly digitized as a high level. When the restore white control voltage is positive, the restore to white mode or state of the digitizer is effectively switched to the restore to black mode or state of the digitizer. Therefore, part (d) of FIG. 2 shows the DBC output in the restore to white off (or restore to black) condition (RWOF). Also, in order that the polarity of the output (BAR CODE) from the inverter 50 is identical whether the bars are white for an inverse code or black for a direct code, BC POL is high (not WL is then a high level) and the inverter 50 is operative to invert the DBC input.

A circuit 70 similar to that described in the above referenced Bremer application is utilized to inhibit false digitization of direct bar codes on certain initial transitions. This circuit 70 responds to the differentiated, dV/dT analog bar code signal (ABC) and provides an output corresponding to the valleys or negative going peaks of that signal in a first comparator 72. This output is buffered in a buffer operational amplifier circuit 74, which provides an output corresponding to these negative peaks, which may be used for automatic gain control in the bar code reader as discussed in the above referenced Eastman et al. patent. The peak output is also compared with a reference voltage in another comparator circuit 76 which, in the presence of a valley below the reference on an initial transition which can cause false digitization of direct bar codes, operates a clamp transistor circuit 78 which connects the DBC input to the exclusive or gate 54 in the inverter 50 to ground which prevents the BAR CODE output from being produced by this circuit 50. The inhibitor circuit 70 is inhibited by a not kill bar code output from the controller 48 which disables the comparator 76 by applying a voltage much higher than the reference, for example 5 volts, to the inverting input of the comparator 76. This input is applied when inverse bar codes are being digitized.

Figure 4:
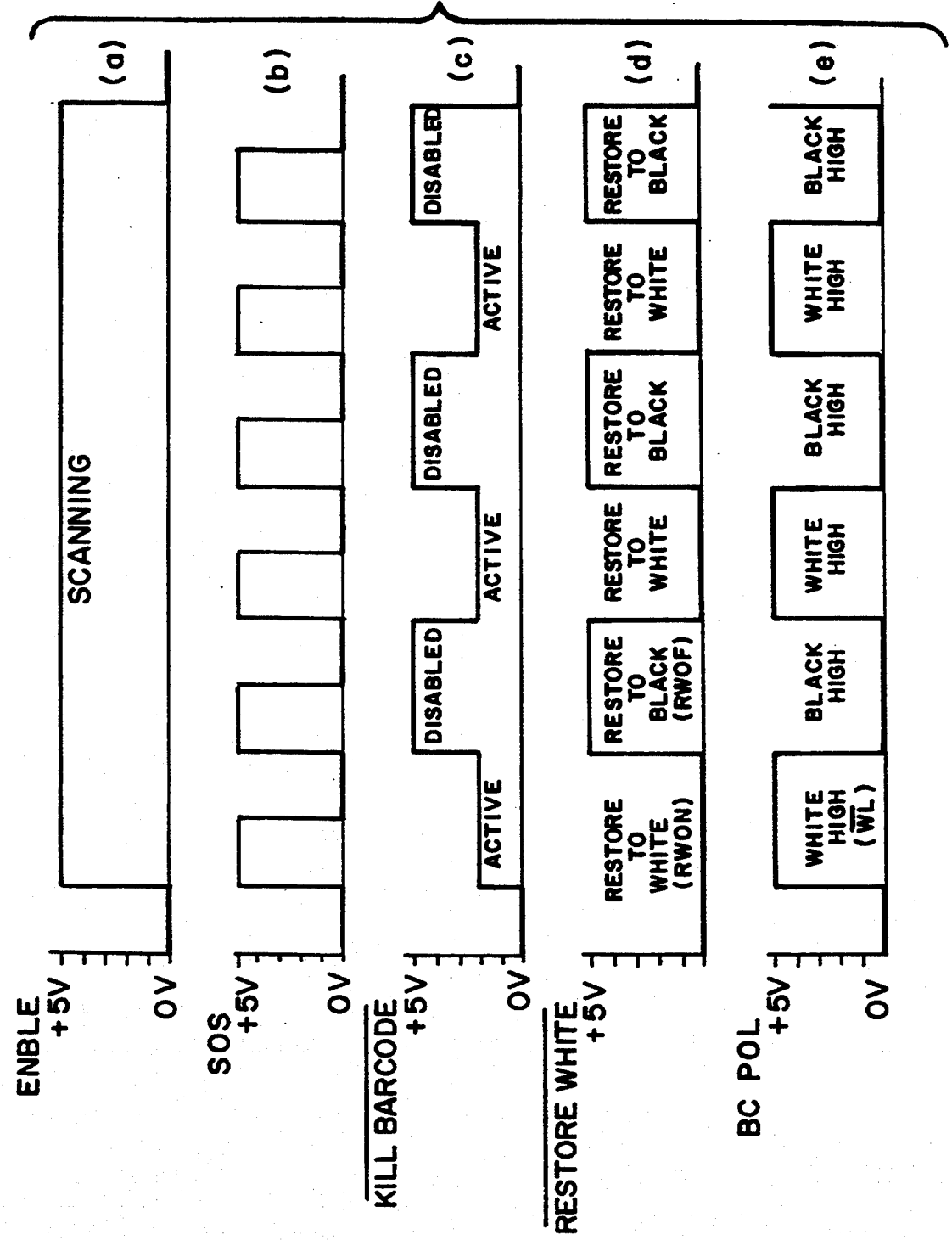
FIG. 4 is a timing diagram illustrating the timing of the system and control signals applied thereto from the microprocessor thereof during a multiplicity of scans of a bar code.

The microprocessor controller 48 operates in conjunction with the digitizer circuitry to enable the bar code reader to read codes whether they are direct or inverse codes during a series of scans until the code is read and the reader is inhibited by either an acknowledged signal or the removal (change of state) of the enable signal to the controller 48. The time during which scanning occurs is illustrated in part (a) of the timing diagram shown in FIG. 4. During this period there are a plurality of scans, namely eleven scans in opposite directions which start on each transition of the SOS signal generated in the controller 48, as shown in part (b) of FIG. 4. For each pair of successive scans, in opposite directions, the digitizer system of FIG. 3 is enabled to properly digitize a direct code, followed by an inverse code. In this connection and as shown in FIG. 4, part (e), the BC POL output (not WL) is high which causes the inverter 50 to provide a black bar as a low state. In order to invert the inverse code so as to provide the same digitized signal when inverse codes are digitized, BC POL changes state to a low state to follow the inverse codes, where a white bar will provide a logical low level. The BC POL control voltage thus changes every two scans.

Similarly, the not restore to white control level from the controller 48 is turned on (logic high) during the alternate pair of scans where inverse bar codes are enabled to be properly digitized, as is shown in part (d) of FIG. 4. The not kill bar code control level is of two levels, one a low level when the inhibitor circuit 70 is active, which is the case where direct codes are properly digitized. The not kill bar code level is increased in order to inhibit (disable) the output from the inhibiter circuit 50 by biasing the comparator 76 so that the base of the transistor 78 is kept low (approximately at ground potential level) so as to maintain the transistor clamp switch 78 open and not affect the inverter 50 when proper digitization of inversed bar codes occurs.

While successive pairs of scans occur when the digitizer system looks for direct codes and then for inverse codes with the timing shown in FIG. 4, it will be appreciated that alternate scans may be used or uneven number of scans when looking for either the direct or the inverse code. It may be more desirable to use, for example three of four successive scans to look for direct codes and the last of the four to look for inverse codes, when inverse codes are less likely to be encountered in bar code scanning and reading operations.

From the foregoing description, it will be apparent that there has been provided an improved system for digitizing bar codes which enables both direct or normal and inverse bar codes to be digitized without generating false or erroneous digital representations of bar codes. Variations and modifications in the herein described system in accordance with the invention will undoubtedly suggest themselves to those skilled in the art. Accordingly, the foregoing description should be taken as illustrative and not in a limiting sense.

I claim:

1. A system for enabling a bar code reader for reading a direct bar code having bars of lower reflectivity than a background on which the bars are disposed to read inverse bar codes where the bars are of higher reflectivity than the background, which system comprises means for digitizing signals representing light returned when the code is scanned into a digitized bar code output having two states, one corresponding to the bars and the other corresponding to the background, means for restoring the output to one of said states, means for changing the state to which said restoring means restores the digitized bar code output when the inverse bar code is being digitized, thereby inhibiting a premature change of state at the onset of scanning, and means for inverting the states of said bar code digitized output when said inverse bar code is being digitized to provide a digitized output having like states, whether representing direct or inverse codes.

2. The system according to claim 1 wherein said digitizing means includes means for comparing the levels of a pair of said signals representing light returned from the code, one of which is delayed with respect to the other, and providing said output in one of said two states when said one of said signals is about equal to or exceeds the other of said signals, and said restoring means comprises means for applying a bias voltage to said comparing means to maintain said output in said other of said two states in the absence of said one signal being about equal to or exceeding said other signal, said state changing means comprising means in said bias voltage applying means for changing said bias from a level where said output is maintained in said other state in the absence of said one signal being about equal to or exceeding said other signal.

3. The system according to claim 2 which comprises computer means which is included in said means for changing said bias and said means for inverting said states.

4. The system according to claim 3 wherein said computer means includes means for operating said state changing means and said inverting means on different ones of a series of scans of the code which occur until the code is read, thereby enabling said reader to properly read the code whether said code is a direct or an inverse code.

5. The system according to claim 4 wherein said reader has means for inhibiting said output upon transition of said signals representing light returned from said code from a lower to higher reflectivity at the onset of said code, and means for inhibiting said output inhibiting means when said inverse bar code is being digitized, and said computer means includes means for operating said output inhibiting means when said inhibiting means and said inverting means are also operated.

6. The system according to claim 3 wherein said reader has means for inhibiting said output upon a transition of said signals representing light returned from said code from a lower to higher reflectivity, and means for inhibiting said output inhibiting means when said inverse bar code is being digitized.

7. The system according to claim 1 further comprising means for operating said scanner to carry out a series of successive scans which occur until the bar code is read, and means for operating said state changing means and said inverting means on different ones of said scans, thereby enabling said reader to properly digitize said code whether said code is a direct or an inverse code.

8. The system according to claim 7 wherein said state changing and said inverting means operating means comprises computer means for controlling said reader, and said different scans are alternate scans in said series.

9. The system according to claim 1 wherein said reader has means for inhibiting said output upon a transition of said signals representing light returned from said codes from a lower to higher reflectivity, and means for inhibiting said output inhibiting means when said inverse bar code is being digitized.

* * * * *